C. W. SHARTLE.
PROCESS OF MAKING PULP USED IN THE MANUFACTURE OF PAPER.
APPLICATION FILED JUNE 17, 1920.

1,405,946.

Patented Feb. 7, 1922.
2 SHEETS—SHEET 1.

INVENTOR.
Charles W. Shartle,
BY Toulmin & Toulmin
ATTORNEYS.

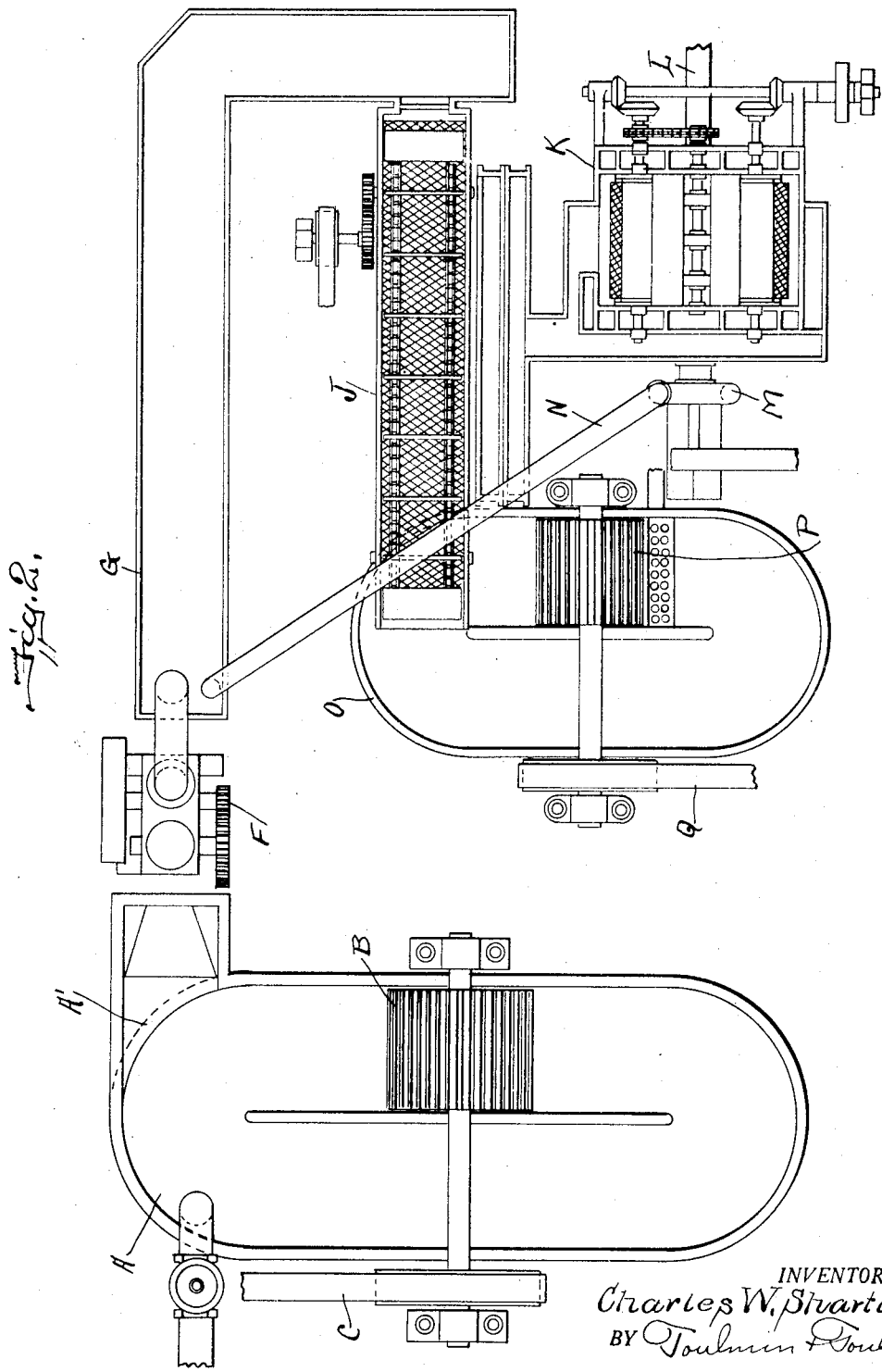

UNITED STATES PATENT OFFICE.

CHARLES W. SHARTLE, OF MIDDLETOWN, OHIO.

PROCESS FOR MAKING PULP USED IN THE MANUFACTURE OF PAPER.

1,405,946. Specification of Letters Patent. Patented Feb. 7, 1922.

Application filed June 17, 1920. Serial No. 389,583.

*To all whom it may concern:*

Be it known that I, CHARLES W. SHARTLE, a citizen of the United States, residing at Middletown, in the county of Butler and State of Ohio, have invented certain new and useful Improvements in Processes for Making Pulp Used in the Manufacture of Paper, of which the following is a specification, reference being had therein to the accompanying drawing.

This invention relates to an improved process by which raw stock containing relatively soft and hard material may be converted into two distinct and separated products. From the softer material the process produces a pulp suitable for making what might be called paper of ordinary strength. From the harder constituent of the stock the process produces a pulp suitable for making what may be generally termed as strong or tough paper. Both of these products are produced concurrently during the operation of the process.

Such is the object and such the result of the practice of this improved process—dual product from a common source of stock.

The materials which generally comprise this raw stock are sulphite pulp usually made from wood, straw and other vegetable products, scraps of paper, rags and cardboard in variable proportions and grades, and various fibrous materials, coarse and fine, as cordage, burlaps, canvas, cotton, linen, silks, etc. Some of these are what may be called relatively soft materials and other relatively hard materials. It is from these different characters of materials that the two completed products are produced under my process.

I have illustrated herein two forms of apparatus by either of which my process may be practiced. These apparatus are merely two of various kinds that may be employed.

In these drawings:—

Fig. 2 is a like view of an apparatus modified in one particular, as will hereinafter appear.

Figure 1:
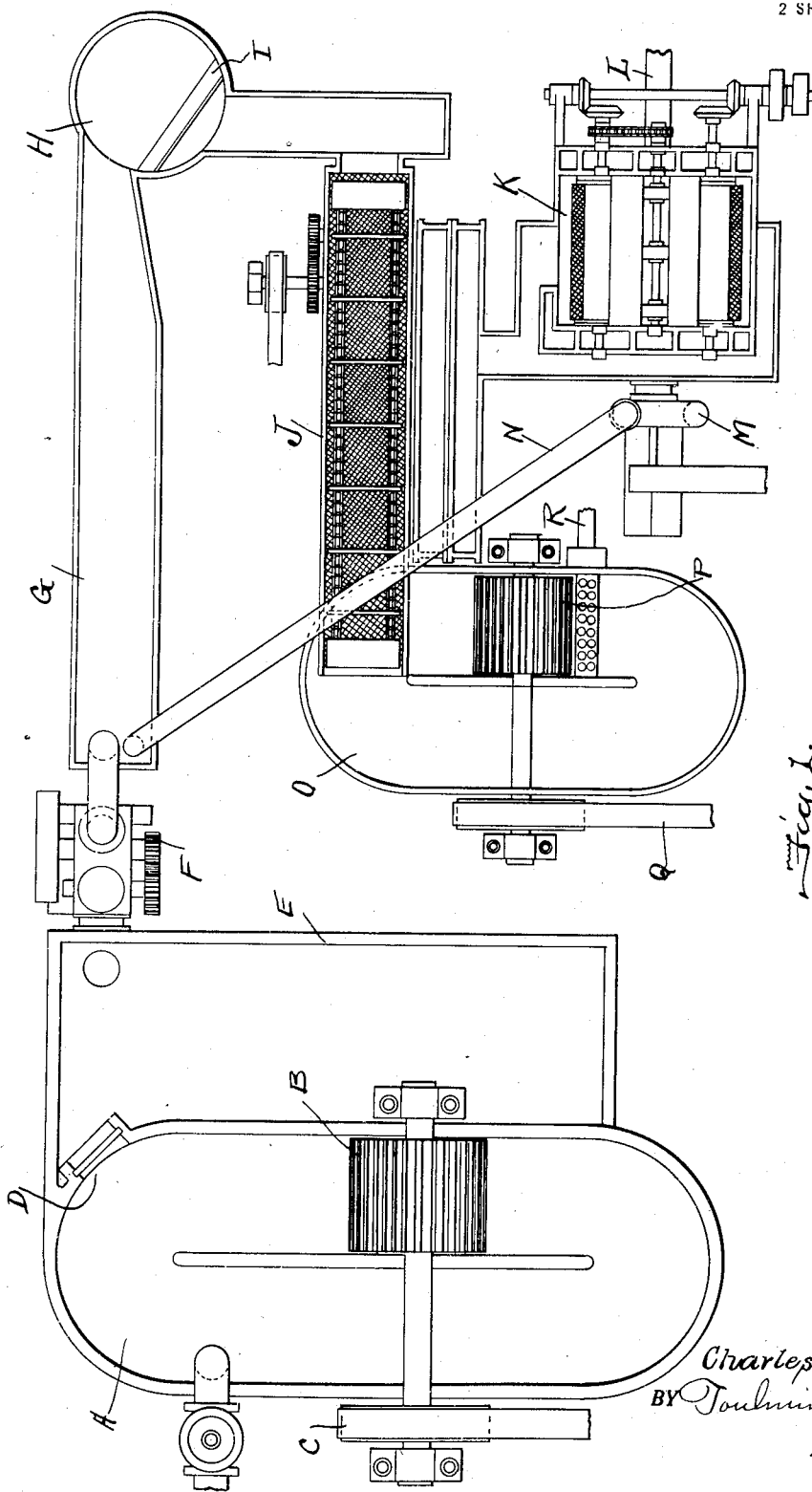
Fig. 1 is a plan view of an apparatus, diagrammatic in form.

I will first describe my process and then later point out how it may be practiced by means of the apparatus selected for illustration.

The process consists in a breaking operation by which the raw stock referred to is reduced in size, that is, by which the various pieces comprising the batch are broken up and reduced to a generally uniform state or size. This breaking operation is performed in water, that is, the material is circulated in water during this breaking operation.

In this broken state the material is conveyed to a suitable point where it is subjected to a settling operation. For this purpose it is introduced into a body of water. The heavier portions, those which will either sink or barely float, are thereby caused to settle and so separate themselves from the lighter or truly floatable portions. The latter pass on to a point where they are subjected to a whirlpool operation, if desired, or, if not, they are conducted on to a screening operation. Intermediate or ahead of the screening step an act of skimming is performed. The purpose is to take off by this skimming step what may be called foreign material. This so-called foreign material is usually in the form of cork and wood.

The now lighter material is subjected to a screening step. The screenings which pass through are subjected to a thickening operation by which the excess of water is drawn off, leaving the fine material which constitutes the finished product derived from the softer materials in the raw stock, which being softer have yielded to the several steps of treatment so thoroughly that they became small enough to become screenings in the screening operation. Thus, one product, that from the softer stock, which is to be used in making paper of ordinary strength, is obtained.

The tailings left over from the screening operation are subjected to a beating operation, in water. The effect of the beating operation is to reduce these tailings, which are principally composed of the harder materials in the original stock, to the finally required fineness. To this end they are subjected to another screening operation so that the finer portions are drawn off as the beating step progresses. In this way the stronger paper for the stronger grades of pulp is produced.

It will be noted that my process embraces the excellent provision of a concurrent production of two distinct products from a common batch of material, namely, a paper pulp from the softer constituents of the stock and another paper pulp from the harder constituents. Both products are separately delivered and kept distinct. This has been found to be of marked value in the economical and rapid production of paper pulp.

Turning now to the apparatus by which my process may be practiced I first refer to that shown in Fig. 1. It comprises a breaker composed of a vessel A adapted to contain a quantity of water with a batch of the raw stock of the heterogeneous character before mentioned. In this vessel is mounted a breaker proper shown at B, composed of a drum carrying coarse, strong blades which reduce all the material to a generally coarse and more or less uniform state. A belt pulley C is utilized to rotate the breaking drum. A gate D opens communication from the breaker into a reservoir E. When a suitable quantity of coarse stuff has been produced in the breaker the gate is opened and it is flowed into the reservoir. The gate will usually then be closed and while another quantity is being produced in the breaker that in the reservoir will be drawn off by a stock pump F and delivered into a settling trough G. This trough contains sufficient water to permit of the heavier and practically non-floatable portions settling to the bottom, while the lighter material rises to the top, and, in this form of apparatus, moves on to a whirlpool H which performs the office of whirling the material centrifugally so that certain portions of it, such as wood, cork or other foreign substances, will be skimmed off by a skimmer I, of conventional form. The lighter stuff will then pass to a screen J. Here the finer particles pass through as screenings and discharge thence into a thickener K of conventional form. Here the water is essentially drawn off from the batch to leave a product of fine pulp which passes from a discharge pipe L to a suitable chest.

This is the product derived from the softer portions of the stock.

The excess water in the thickener is conveyed by a pump M and a pipe N back to the settling trough for re-use.

The tailings from the screen pass into a beater indicated at O, being a vessel containing a beater proper P, a drum having blades set more closely together and producing a finer reduction than those used in the breaker. This drum is driven by a belt pulley Q.

In order to separate the sufficiently fine material from the general batch in the beater it is equipped with a well known backfall, a perforated wall or plate, which permits the fine portions to pass through so as to be discharged into a pipe R, whence it is delivered to a suitable chest. As the beating operation progresses the final reduction of this lighter material is effected, the sufficiently fine portions passing out, as stated, and the tailings remaining and receiving further treatment, until they too are sufficiently reduced.

Thus it will be seen from the two products, one of the softer and the other of the harder materials, are produced concurrently but separated and discharged at different places in the apparatus and in the steps of the process.

The description just given with reference to Fig. 1 applies equally to the apparatus illustrated in Fig. 2 with the exceptions that in Fig. 2 the gate is omitted and a weir or overflow is formed in the breaker at the point A′, over which the coarsely reduced material passes into a box B′ and thence into the pump. The next feature of difference is in the omission of the whirlpool H and the location of the skimmer just in advance of the screen.

It will be understood, of course, that after the heavier material settles in the settling operation or in the settling troughs in the apparatus illustrated, it may at convenient intervals be removed by any suitable means.

Having thus fully set forth my invention and two means by which the process may be practiced, what I claim as new and desire to secure by Letters Patent, is:—

1. The herein described process for producing a dual product from common stock consisting of subjecting a quantity of heterogeneous stock to a breaking operation in water, in then subjecting the coarsely reduced material to a settling operation in water, in then subjecting the lighter particles which have not settled to a screening operation, in subjecting the resulting screenings to a thickening operation by which the surplus water is drawn off and the residuum mass is left to constitute paper pulp derived from the softer material in the stock, in separately subjecting the tailings from the screening operation to a beating operation and a concurrent further screening step by which the finer portions are separated as produced and which constitute the paper pulp derived from the harder material in the stock.

2. The herein described process for producing a dual product from common stock consisting of subjecting a quantity of heterogeneous stock to a breaking operation in water, in drawing off the coarsely reduced stock into a confined mass, in then separating this mass from that undergoing the breaking treatment, in then subjecting the confined mass of material to a settling operation in water, in then subjecting the lighter portions which have not settled to a screening operation, in separately subjecting the resulting screenings to a thickening operation by which the surplus water is drawn off and the residuum mass is left to constitute paper pulp derived from the softer material in the stock, in subjecting the tailings from the screening operation to a beating operation and a concurrent further screening step by which the finer portions are separated as produced and which constitute the paper pulp derived from the harder material in the stock.

In testimony whereof, I affix my signature.

CHARLES W. SHARTLE.